United States Patent Office 2,851,844
Patented Sept. 16, 1958

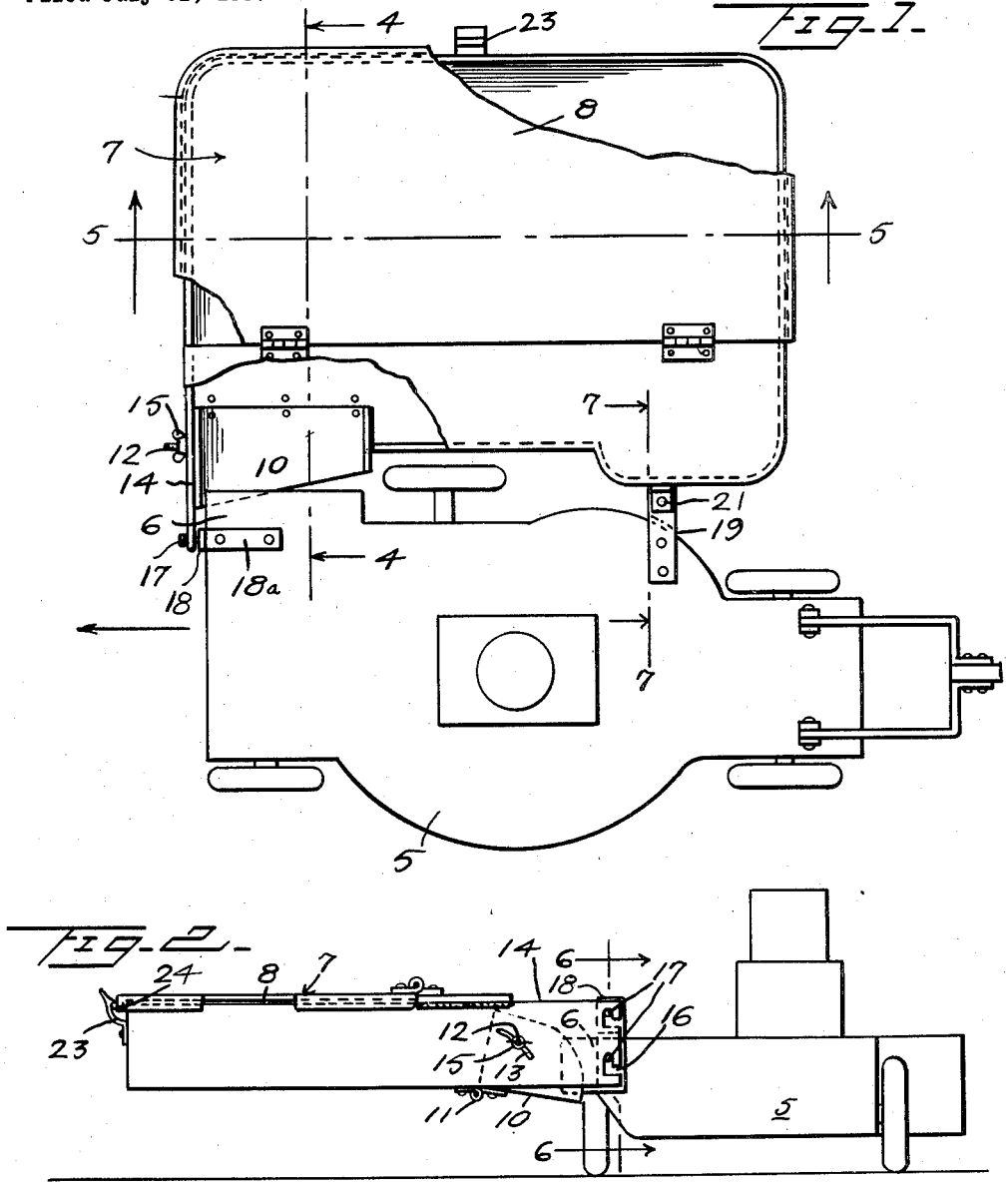

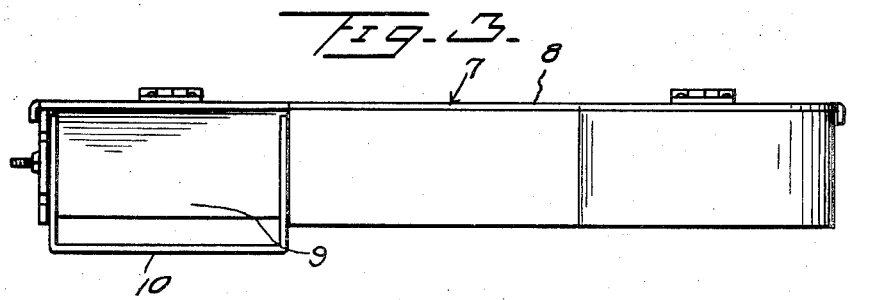
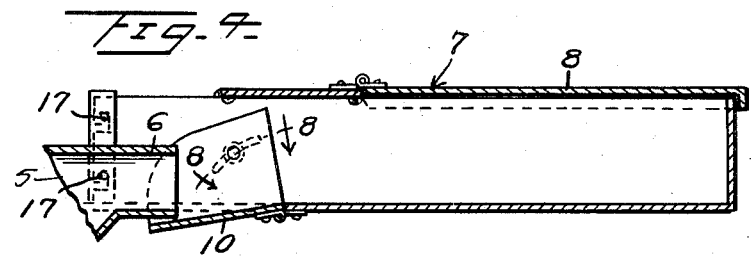
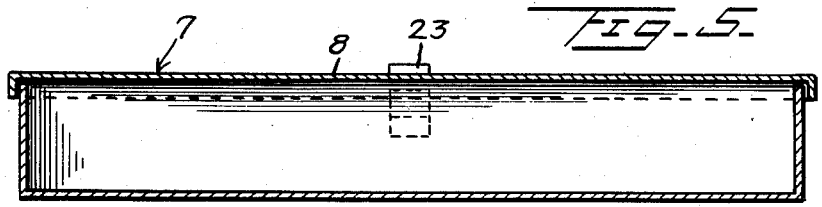
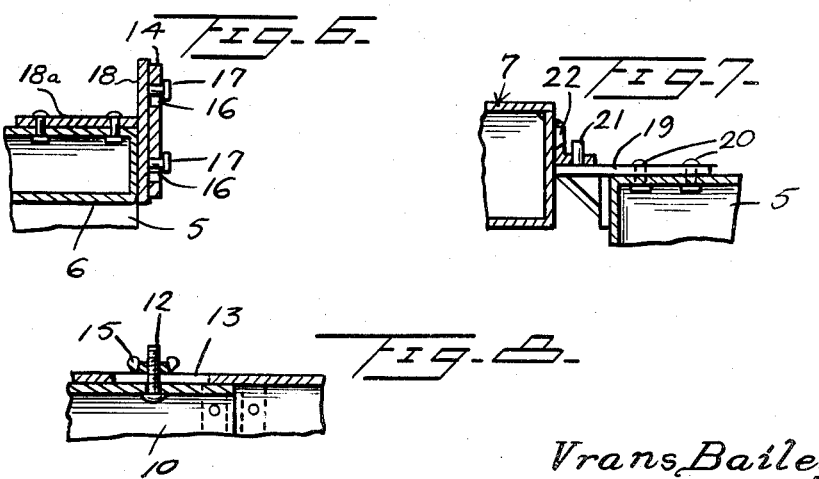

2,851,844
POWER MOWER GRASS CATCHER
Vrans Bailey, West Sacramento, Calif.
Application July 31, 1957, Serial No. 675,326
1 Claim. (Cl. 56—202)

This invention relates to a grass catcher designed for use on power lawn mowers of the type wherein the rotary blade thereof operates on a vertical shaft in a horizontal plane.

An important object of the invention is to provide a grass catcher of this type which may be readily attached and removed from the lawn mower when it is necessary to dump the cut grass therefrom.

Another object of the invention is to provide a grass catcher into which cut grass will be blown by the rapidly rotating blade of the mower, thereby cleaning the lawn of such grass simultaneously with the cutting operation.

A still further object of the invention is to provide an adjustable chute carried by the catcher which will be disposed adjacent to the discharge opening of the mower housing to confine the cut grass to the receiving opening of the catcher.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a plan view, with parts broken away, of a mower equipped with a grass catcher constructed in accordance with the present invention.

Fig. 2 is a front elevational view thereof.

Fig. 3 is an enlarged side elevational view of the grass catcher showing the chute as extending therefrom.

Fig. 4 is an enlarged sectional view taken on line 4—4 of Fig. 1.

Fig. 5 is an enlarged sectional view taken on line 5—5 of Fig. 1.

Fig. 6 is an enlarged sectional view taken on line 6—6 of Fig. 2.

Fig. 7 is an enlarged sectional view taken on line 7—7 of Fig. 1.

Fig. 8 is an enlarged fragmental sectional view taken on line 8—8 of Fig. 4.

Referring to the drawings in detail, a mower of the type embodying a rotor blade operating in a horizontal plane on a vertical shaft, is indicated generally by the reference character 5, the mower having a discharge spout 6 adjacent to the forward end thereof, through which the cut grass is discharged from the mower housing.

The catcher forming the subject matter of the present invention, is indicated generally by the reference character 7 and is substantially rectangular in formation, as better shown by Fig. 1 of the drawings. The catcher housing is in the form of a housing provided with an open top normally closed by the closure 8. One side wall of the housing adjacent to the forward end thereof is provided with an opening 9 through which the grass cut by the mower 5 and discharged through the discharge spout 6 enters the catcher.

The reference character 10 indicates a chute which is pivotally mounted on the bottom of the catcher housing, as by means of hinges 11, the chute being of a length to extend under the discharge spout 6 of the mower, the chute being secured in its proper adjusted position by means of the bolt 12 which passes through an opening in the chute 10 and moves through the arcuate shaped slot 13 formed in the extension 14 forming a part of the front wall of the catcher housing. Thus, it will be seen that due to the construction of the slot and bolt, the chute may be moved to various angular positions with respect to the spout 6, to insure close contact between the chute and spout 6 to prevent the cut grass from passing from the mower between the spout 6 and chute 10.

A wing nut 15 operates on the bolt 12 and holds the chute securely against accidental displacement.

The extension 14 is provided with bayonet slots 16 that extend inwardly from the edge thereof, the bayonet slots 16 accommodating the spaced pins 17 that are formed on a vertical arm 18 having a horizontal flange 18a secured to the top or upper surface of the mower 5, as shown by Fig. 1.

A horizontal arm 19 is secured to the upper surface or top of the mower 5 by means of bolts 20, the arm 19 being provided with an upstanding pin 21 that extends into an opening formed in the bracket 22 secured to the side wall of the catcher housing near the rear end of the housing. Thus it will be seen that by this construction the catcher is removably secured to the mower housing and may be readily and easily dismounted or repositioned to permit the dumping of the contents of the catcher with facility.

A pivoted latch 23 is mounted on the side wall of the catcher housing and is adapted to fit over the keeper 24 extending from one edge of the closure or pivoted cover 8.

It will be noted that because of the construction of the catcher, the catcher is supported in spaced relation with respect to the ground surface as better shown by Fig. 2 of the drawings and will not interfere in any way with the operation of the mower in cutting a lawn.

Having thus described the invention, what is claimed is:

A grass catching device adapted to be attached to a lawn mower having a lateral displacement spout, comprising a container having vertical side walls, a bottom and end walls, and an open top, a chute pivotally mounted on said bottom wall adapted to extend under said discharge spout, bolt means securing said chute in a selected position of pivotal adjustment, an extension forming a part of one of said side walls said extension having bayonet slots therein adapted to engage corresponding headed pins carried by said mower, and an L-shaped bracket having an opening therein adapted for engagement by an upstanding pin carried by said mower secured to one of said end walls at a point spaced from said extension, a hinged closure for said open top, and latch means for said closure.

References Cited in the file of this patent
UNITED STATES PATENTS

| | | |
|---|---|---|
| 370,361 | Twiggs | Sept. 20, 1887 |
| 1,927,152 | Bolens | Sept. 19, 1933 |
| 2,641,100 | Sylvester | June 9, 1953 |
| 2,783,604 | Cahill | Mar. 5, 1957 |